United States Patent [19]

Behr

[11] Patent Number: 5,141,193
[45] Date of Patent: Aug. 25, 1992

[54] MOUNTING SYSTEM FOR A DECELERATION SENSOR

[75] Inventor: Leonard W. Behr, Pontiac, Mich.

[73] Assignee: Automotive Systems Laboratory, Inc., Farmington Hills, Mich.

[21] Appl. No.: 554,710

[22] Filed: Jul. 18, 1990

Related U.S. Application Data

[63] Continuation of Ser. No. 380,804, Mar. 17, 1989, abandoned.

[51] Int. Cl.$^5$ .............................................. B60R 19/06
[52] U.S. Cl. .................................. 248/309.1; 248/314; 280/735
[58] Field of Search .............................. 248/309.1, 314; 200/61.08, 61.53; 280/735; 180/274

[56] References Cited

U.S. PATENT DOCUMENTS 3,793,498  2/1974  Matsui et al. .................... 180/274 X
4,399,887  8/1983  Okada .................... 200/61.45 M X Primary Examiner—Alvin C. Chin-Shue
Attorney, Agent, or Firm—Lyon & Delevie

[57] ABSTRACT

A mounting system for a vehicle deceleration sensor comprises a mounting bracket complementary to the housing of the deceleration sensor so as to accept the sensor in a slidable lost motion relationship.

1 Claim, 1 Drawing Sheet

MOUNTING SYSTEM FOR A DECELERATION SENSOR

This is a continuation of Ser. No. 07/380,804, filed Mar. 3, 1989, now abandoned.

BACKGROUND OF THE INVENTION

Experience gained through crash testing a variety of vehicles has revealed that, in many vehicles and in many types of crash situations, the crash sensor detects the crash too late for optimum deployment of an inflatable occupant restraint system. Delayed sensing of the crash event may occur because the sensor is mounted too far away from the crush zone, or the crash pulse is attenuated or delayed because of the collapse of soft, front-end vehicle structures. The only way to avoid such delay is to mount the sensor in the crush zone, where the information about the crash arrives earliest.

Analysis of vehicles after accidents indicates that the vehicle structure on which the sensor is mounted is often pushed back and/or rotated by the crash. Thus, conventional inertial sensors, such as ball-in-tube sensors or roller/spring sensors, when used in the crush zone, are subject to being destroyed or disconnected by the crash before they can signal the event.

One proposal to avoid the undesirable aspects of crush zone mounting is to replace inertial sensors with rugged switches which are closed by the impinging structure of the vehicle as it is pushed back by the force of the crash. Although this expedient works in some crash situations, it is limited by the fact that if the switch is not in the crush zone, the switch cannot detect the crash. For example, if the switch is mounted on body panels, it cannot detect, for example, the undercarriage of a vehicle hanging up on a low post or falling into a hole, in which situation the occupant would not be protected.

SUMMARY OF THE INVENTION

The object of this invention is a "lost motion" mounting bracket that facilitates the use of a rugged inertial sensor in the crush zone of a vehicle. The sensor, if involved in the crushing, moves back into its mounting bracket sufficiently to allow actuation of its internal mechanism. If the mounting location is properly chosen, such movement and actuation can take place before the vehicle structure bulkhead upon which the sensor is mounted is displaced or rotated due to the crash.

If the sensor and mounting bracket are not directly involved in the crush zone, the normal inertial properties thereof effect actuation of the occupant restraint system because vehicle deceleration is transmitted to the inertial mechanism by the mounting bracket.

DETAILED DESCRIPTION OF THE PREFERRED EMBODIMENT OF THE INVENTION

Figure 1:
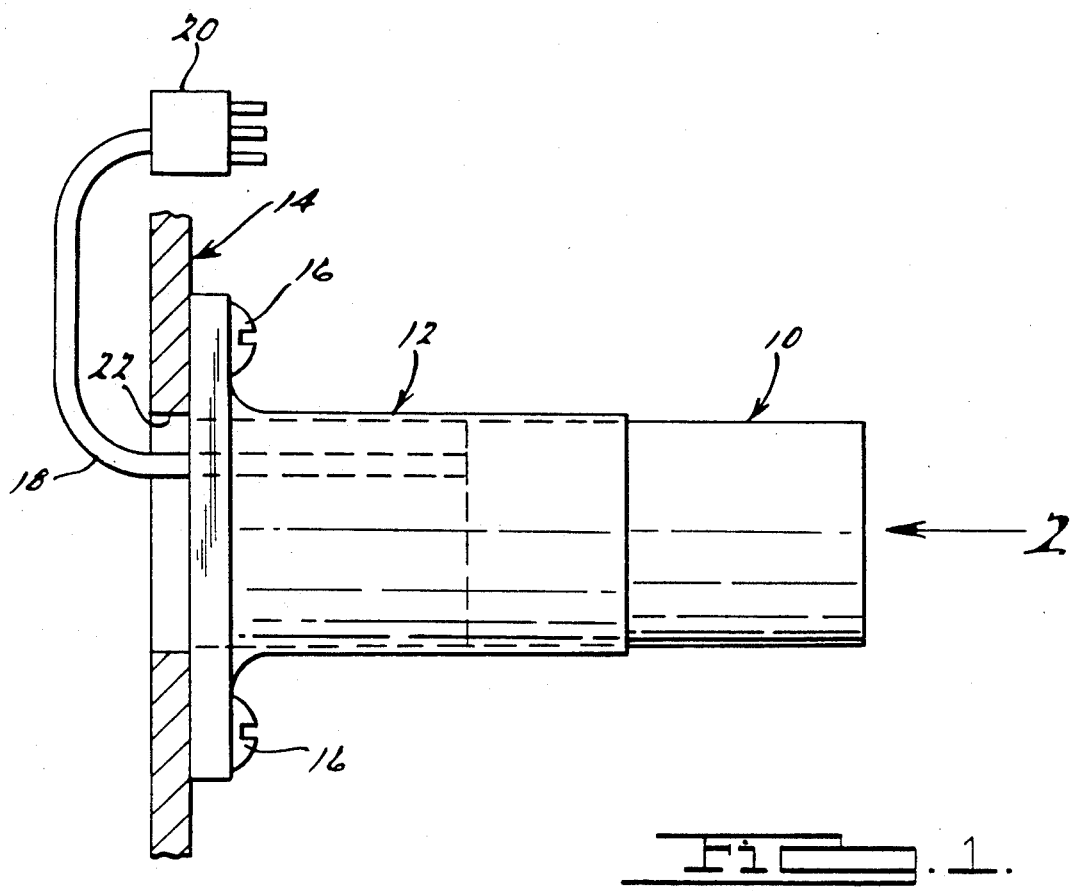
FIG. 1 shows a mounting bracket in accordance with the present invention used to mount an electro-magnetic sensor to a panel or bulkhead.
Figure 2:
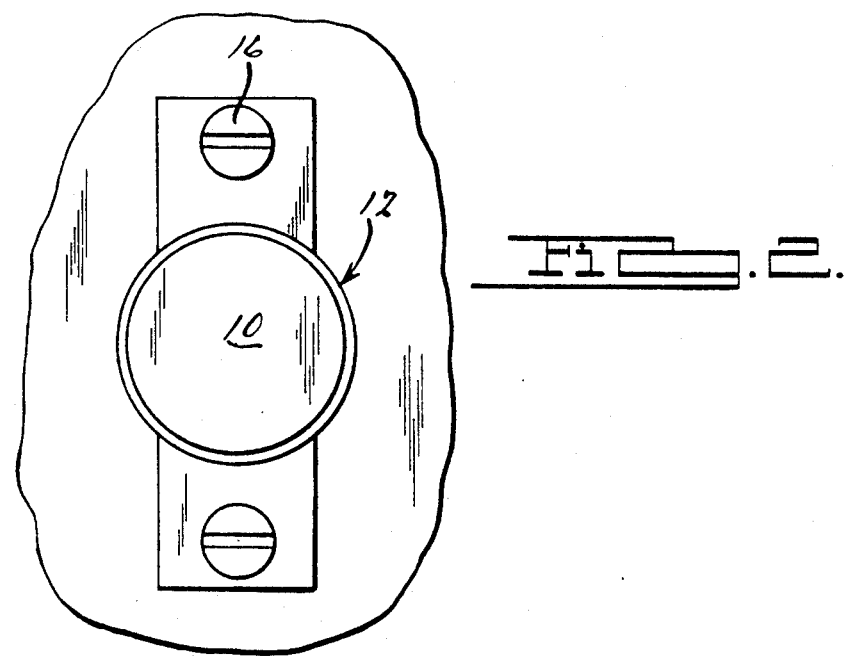
FIG. 2 is a view taken in the direction of the arrow "2" FIG. 1.

As seen in FIG. 1, a cylindrical inertial sensor 10 is press-fit into a complimentary bracket 12 in tight but relatively slidable relationship. The sensor 10 protrudes forwardly of the bracket 12 so as to encounter folding or crushing of vehicle structure prior to the bracket 12. The bracket 12 is secured to a panel 14 of a vehicle (not shown) as by screws 16. A pigtail 18 has an electrical connector 20 thereon which extends through an aperture 22 in the body panel for connection to a conventional airbag inflator (not shown).

In the event of a crash that results in the impingement of the vehicle structure against the sensor 10, the sensor 10 is free to slide relative to the housing 12. The slidable lost motion connection of the sensor 10 to the housing 12 prevents the sensor 10 from being destroyed and ensures that sufficient deceleration is transmitted thereto for the internal mechanism thereof to operate prior to crush or rotation of the panel 14.

While the preferred embodiment of the invention has been disclosed, it should be appreciated that the invention is susceptible of modification without departing from the scope of the following claims.

I claim:

1. A mounting system for a deceleration sensor comprising deceleration sensitive components for closing an electrical circuit, adapted to be mounted on a vehicle having a chassis,
   - a discrete housing for enclosing, supporting and isolating the deceleration sensitive components of said sensor from the chassis of said vehicle,
   - a flexible electrical pigtail extending externally of said sensor housing for connection to an occupant restraint system, and
   - a mounting bracket having a first portion complementary to the housing of said deceleration sensor for the acceptance thereof in slidable relationship and a second portion for attachment to a structural element of said vehicle, whereby said sensor housing is free to move relative to said mounting bracket upon impingement of vehicle structure thereagainst.

* * * * *